United States Patent [19]

Smith et al.

[11] Patent Number: 5,230,546
[45] Date of Patent: Jul. 27, 1993

[54] VANITY MIRROR VISOR COVER

[75] Inventors: Nels R. Smith, Holland; Thomas C. VandenBerge, Jenison, both of Mich.

[73] Assignee: Prince Corporation, Holland, Mich.

[21] Appl. No.: 935,014

[22] Filed: Aug. 25, 1992

[51] Int. Cl.⁵ .............................................. B60J 3/02
[52] U.S. Cl. .................................. 296/97.1; 296/97.5; 156/275.1
[58] Field of Search ............................ 296/97.1, 97.5; 362/137; 220/200; 156/275.1

[56] References Cited

U.S. PATENT DOCUMENTS

| | | | |
|---|---|---|---|
| 4,239,278 | 12/1980 | Skilliter et al. | 296/97.1 |
| 4,626,019 | 12/1986 | Tung et al. | 296/97.1 |
| 4,715,644 | 12/1987 | Lafanoff et al. | 296/97.1 |
| 4,830,424 | 5/1989 | Svensson | 296/97.1 |
| 4,944,971 | 7/1990 | McLaughlin | 296/97.1 X |
| 5,007,532 | 4/1991 | Binish | 296/97.1 |
| 5,098,150 | 3/1992 | Smith et al. | 296/97.1 |
| 5,131,711 | 7/1992 | Laferle | 296/97.1 |

Primary Examiner—Robert R. Song
Attorney, Agent, or Firm—Price, Heneveld, Cooper, DeWitt & Litton

[57] ABSTRACT

A cover and a method of manufacturing a cover for a vehicle accessory such as an illuminated vanity mirror visor. The cover includes a planar generally rectangular core, preferably of a fiberboard material, which is covered on opposite surfaces by an upholstery material. The combination of upholstery and core is placed in an injection molding machine and a rim is molded around the periphery of the upholstered core. The rim provides both the function of finishing the edge of the cover, as well as providing structural rigidity at the outer periphery of the cover for strength and stability. One edge of the rim may integrally include hinge means for pivotally attaching the cover to the accessory.

24 Claims, 3 Drawing Sheets

VANITY MIRROR VISOR COVER

BACKGROUND OF THE PRESENT INVENTION

The present invention relates to the construction of a cover for a vehicle accessory such as an illuminated vanity mirror visor.

Vanity mirrors in vehicle visors are typically covered by a decorative and protective cover such that when the visor is in a lowered use position for sunblocking, the vanity mirror is covered when the mirror is not in use for safety reasons. The cover can be pivoted to a snapped-open position, typically activating lights for illumination of the vanity mirror for use. The cover, therefore, provides not only a safety function, but also a decorative function preventing reflections from the vanity mirror when not in use from distracting the vehicle operator. U.S. Pat. No. 5,098,150 issued on Mar. 24, 1992, discloses an illuminated vanity mirror visor of this type.

In the past, covers for vanity mirrors and other vehicle accessories typically have been molded as a single plastic member which may have a pebble-grained surface for ornamentation. For higher line vehicles where a solid plastic cover may be undesirable from a design standpoint, the covers typically have included a relatively large fabric insert and are made by providing an outer cover frame with a significantly large rectangular aperture behind which a fabric pad is located with the combination being enclosed with a backing plate, which is ultrasonically welded to the outer cover. This sandwich construction, although providing a high-quality, decorative cover, is relatively expensive to manufacture both in terms of cost of material and labor. Accordingly, it is desirable to provide an attractive cover which is both functional and which has a reduced cost and is relatively easy to manufacture.

SUMMARY OF THE PRESENT INVENTION

The vanity mirror visor cover of the present invention satisfies these goals by providing a cover for a vehicle accessory such as an illuminated vanity mirror visor which is constructed from a planar generally rectangular core, preferably of a fiberboard material, which is covered on opposite surfaces by an upholstery material. The upholstery material and core are of substantially identical size and co-extensive. The combination of upholstery and core is placed in an injection molding machine and a rim is molded around the periphery of the upholstered core. The rim provides both the function of finishing the edge of the cover as well as providing structural rigidity at the outer periphery of the cover for strength and stability. One edge of the rim may integrally include hinge means for pivotally attaching the cover to the accessory.

In a preferred embodiment of the invention, a core is sandwiched between sheets of the upholstery material which is sealed to the core around the periphery prior to the injection of the rim. This method of manufacturing and resultant cover construction provides an attractive and relatively inexpensive cover which can be used on a variety of vehicle accessories such as a vanity mirror visor. These and other features, objects and advantages of the present invention will best be understood by reference to the following description thereof together with the accompanying drawings in which:

DETAILED DESCRIPTION OF THE PREFERRED EMBODIMENT

Figure 1:
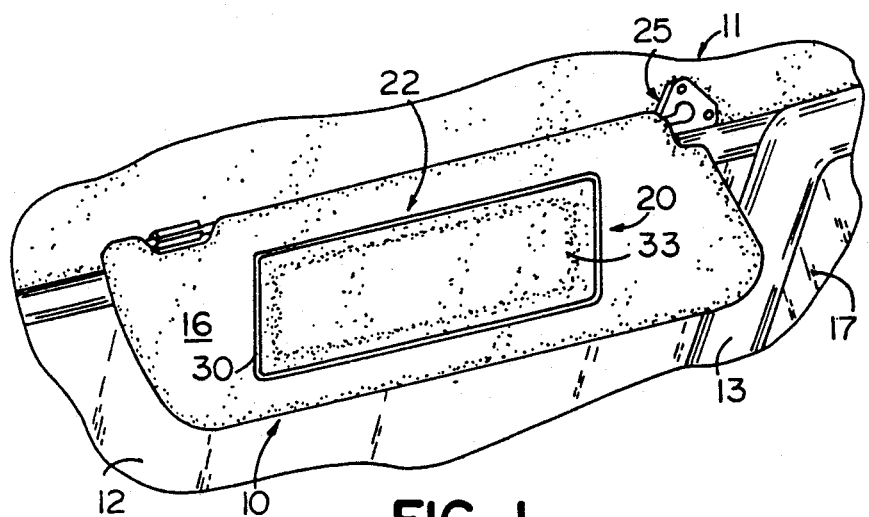
FIG. 1 is a fragmentary, perspective view of a vehicle accessory such as an illuminated vanity mirror visor embodying the present invention.
Figure 2:
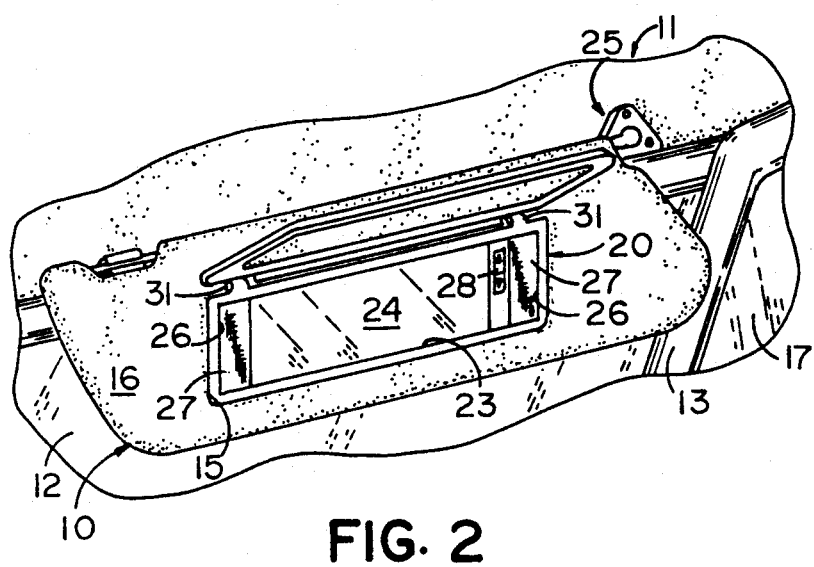
FIG. 2 is a fragmentary, perspective view of the visor shown in FIG. 1 showing the cover in an open position.

Referring initially to FIGS. 1 and 2, there is shown a vehicle accessory such as a visor 10 embodying the cover of the present invention and installed in a vehicle such as an automobile 11 with the installation shown being the right front passenger area adjacent windshield 12 and the "A" pillar 13. Visor 10 includes a pivot mounting assembly 25 for mounting the visor to the roof 26 of the vehicle for movement between a lowered use position illustrated and a raised stored position adjacent the roof. Conventionally, the mounting assembly allows the visor to pivot from the windshield position shown to a position adjacent the side window 17. The visor includes a central core which can be a folded planar material made of a polypropylene or as in the preferred embodiment, a fiberboard material of the type disclosed in U.S. Pat. No. 5,007,532, issued Apr. 16, 1992, and entitled VISOR AND METHOD OF MAKING THE SAME, the disclosure of which is incorporated herein by reference.

The visor 10 includes an illuminated vanity mirror assembly 20 which includes a mirror 24 and mirror frame 23 with a pair of lenses 27 snap-in mounted into apertures 26 in the frame 23 located on opposite sides of the mirror 24. Illumination is provided by lamps (not shown) positioned behind lenses 27, the illumination of which can be controlled by a sliding dimmer control 28 to adjust the illumination as desired.

The illuminated vanity mirror assembly 20 is assembled to the visor core within an aperture 15 thereof by mounting tabs as disclosed in U.S. Pat. No. 5,098,150 issued Mar. 24, 1992, and entitled VISOR COVER HINGE, the disclosure of which is incorporated herein by reference. The illuminated vanity mirror assembly 20 is covered by a pivotally mounted cover 30 embodying the present invention. Cover 30 includes a generally rectangular planar core 32 (FIG. 3) which is covered on opposite sides by layers of upholstery material 34 and 36 as seen in detail in FIGS. 4–9. The peripheral edge 38 of the upholstered core is enclosed by a peripheral rim 40 which is of a polymeric material injection molded around the edge of the core once upholstered.

Figure 8:
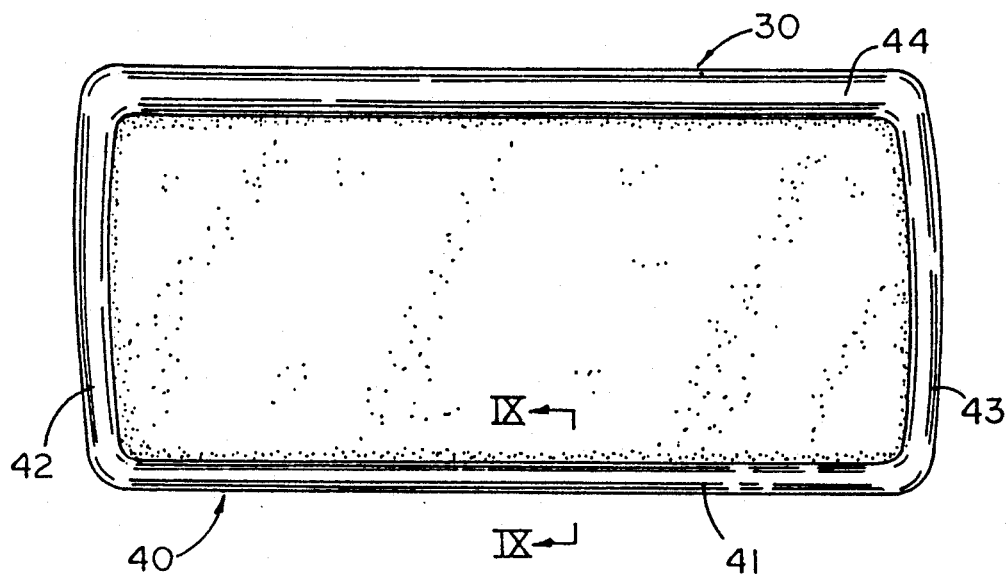
FIG. 8 is an enlarged, front, elevational view of the cover shown in FIGS. 1 and 2.
Figure 9:
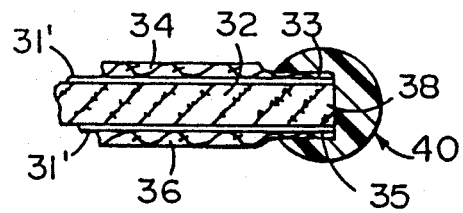
FIG. 9 is a greatly enlarged, fragmentary, cross-sectional view of the cover taken along section line IX—IX of FIG. 8.

Rim 40 includes a lower edge 41, a left edge as viewed in FIG. 8, a right edge 43 and a top 44 which is somewhat larger than the remaining edges 41-43 to accommodate a pair of spaced integral pivot arms 31 (FIG. 2) for snap fitting into the mirror frame as disclosed in the above identified U.S. Pat. No. 5,098,150. As seen in FIGS. 8 and 9, rim 40 encloses the edge 38 of the fiberboard core 32 thus trimming off the cover panel as well as providing the pivot coupling arms for the mounting of the cover to the mirror frame. As can be seen in FIG. 8, the cover is substantially entirely fabric in appearance with the decorative and structural rim 40 extending therearound. As a result of this construction, a relatively thin fiberboard core panel can be employed and yet provide a structural stable and luxurious appearance to the vanity mirror cover The construction details and method of manufacturing the cover is now described.

Figure 3:
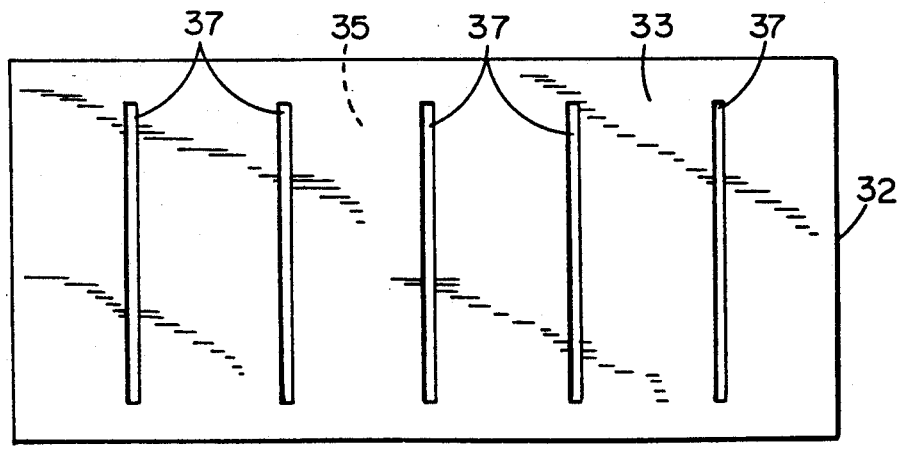
FIG. 3 is a front, elevational view of the core used in the cover shown in FIGS. 1 and 2.
Figure 10:
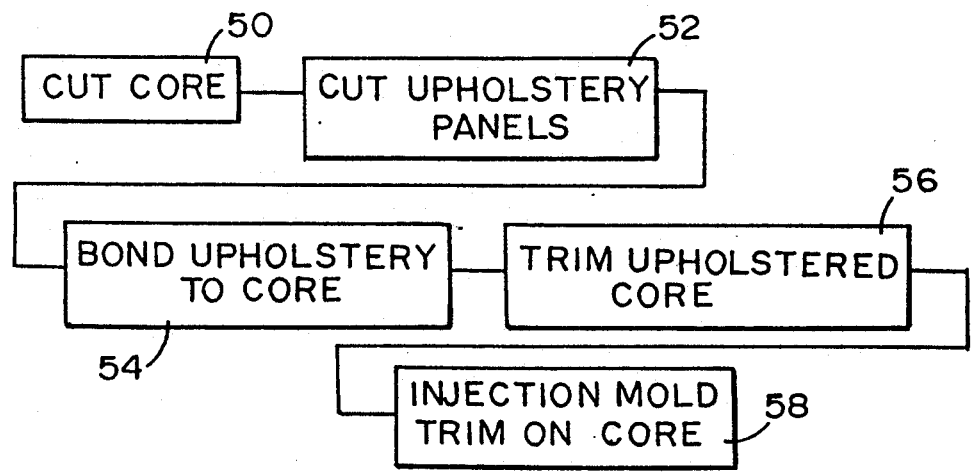
FIG. 10 is flow diagram illustrating the method of manufacturing the cover shown in FIGS. 1–9.

Initially, a fiberboard material having a thickness of from about 0.015-0.100 inches is die cut in a generally rectangular pattern as seen in FIG. 3. The core 32, so formed, is initially roughly dimensioned to cover the vanity mirror of an associated visor to which the cover is mounted and includes a plurality of vertically extending horizontally spaced slots 37 formed therein to accommodate dimensional changes of the cover as the plastic rim 40 is molded thereto and the plastic cools. This cutting step is illustrated as step 50 in FIG. 10. In the preferred embodiment of the invention, the core was made of a commercially available coated fiberboard material sold under the trademark Valdor and has a thickness of about 0.080 inches.

Figure 4:
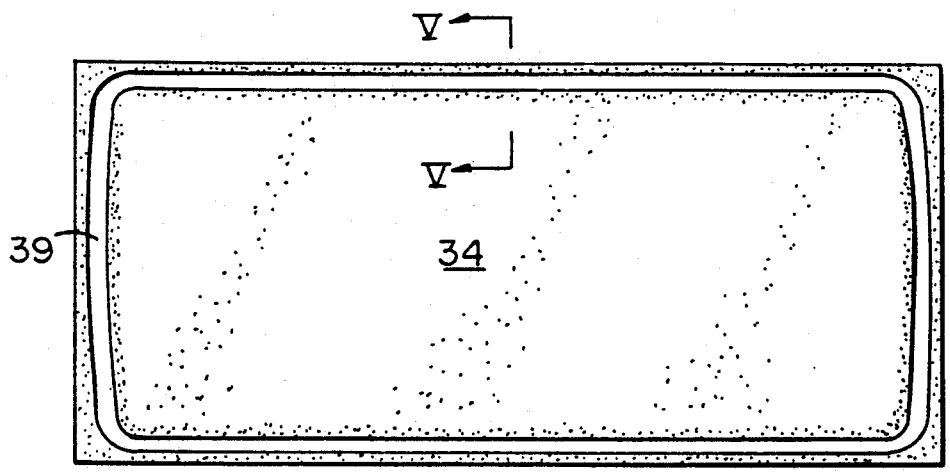
FIG. 4 is a front, elevational view of the core shown in FIG. 3 after it has been upholstered.
Figure 5:
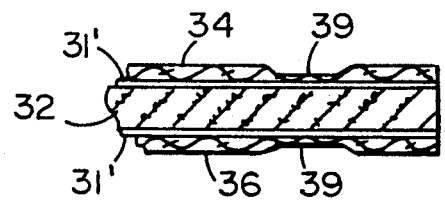
FIG. 5 is an enlarged, fragmentary, cross-sectional view of the structure shown in FIG. 4 taken along section line V—V of FIG. 4.
Figure 7:
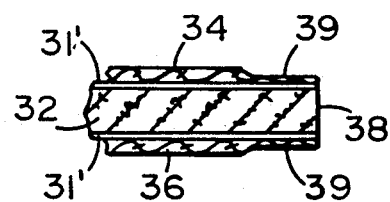
FIG. 7 is an enlarged, fragmentary view of the structure shown in FIG. 6 taken along section line VII—VII of FIG. 6.
Figure 6:
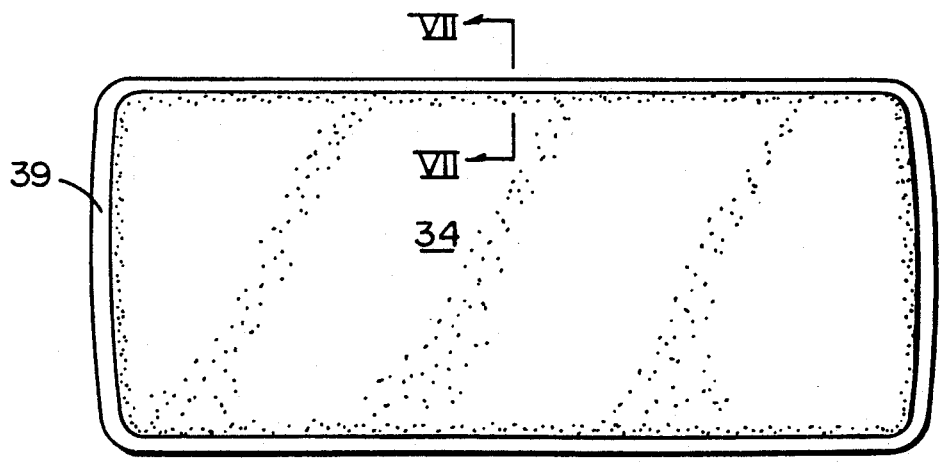
FIG. 6 is a front, elevational view of the upholstered core of FIGS. 4 and 5 after trimming.

Next, the opposite surfaces 33 and 35 of the core 32 are covered by die cut panels (step 52 of FIG. 10) of upholstery material 34 and 36 are aligned on the opposite sides of the core 32. As illustrated in FIGS. 4 and 5, and shown by step 54, and edge defining bead 39 of an RF welding die, bonds the edges of the fabric panels to the core. For such purpose, the foam backed upholstery material includes a thin layer of a polyester film 31', which can be RF welded to form a bond between the core and fabric using conventional welding equipment. The fabric employed for panels 34 and 36 is in common usage in the automotive industry and is commercially available. The bonding of the fabric panels in the edge defining bead 39 is shown by step 54 of FIG. 10. As seen in FIG. 5, the bead 39 is a pinched area of the composite of the core and fabric layers which is subsequently trimmed along its centerline to the exact dimension desired to form a rounded cover insert as shown in FIGS. 6 and 7. This trimming step is shown as step 56 in FIG. 10. The RF bonding of the edges of the fabric to the core prevents the plastic material defining rim 40 from entering the area between the fabric panels and core 32 during the molding step.

After the initial processing, the now upholstered core 32 is covered on opposite sides by fabric panels 34 and 36 but the peripheral edge 38 is unfinished. The partially completed cover shown in FIG. 6 is then positioned in an injection molding machine and held in place while the peripheral rim 40 is injected molded as indicated by step 58 to encapsulate the edge of the cover. The plastic material of the rim is a suitable material such as polycarbonate.

Thus, a visor cover construction is provided in which the fabric panel is injected in place with a peripheral rim providing a trim appearance as well as structural rigidity to the construction. The configuration of rim 40 can be matched to that of a particular vehicle interior and visor appearance and may include, for example, a handle depression formed in the lower edge 41 as well as the pivot arms or sockets in the upper leg 44 as described earlier. It will become apparent to those skilled in the art that various modifications to the preferred embodiments of the present invention can be made without departing from the spirit or scope thereof as defined by the appended claims.

The embodiments of the invention in which an exclusive property or privilege is claimed are defined as follows:

1. A cover for a vehicle accessory comprising:
   a generally planar core covered on at least one side with an upholstery material; and
   a molded polymeric rim extending around the periphery of the core and encapsulating the fabric and core around the periphery thereof to provide structural rigidity to the planar core member and a trim finished appearance thereto.

2. The cover as defined in claim 1 wherein said core is made of fiberboard.

3. The cover as defined in claim 2 wherein said core includes a plurality of parallel spaced slots formed therethrough.

4. The cover as defined in claim 1 wherein opposite sides of said core are covered with upholstery material.

5. The cover as defined in claim 1 wherein said upholstery material is bonded to said core at the periphery thereof.

6. The cover as defined in claim 1 wherein said upholstery material includes a polymeric film on a side facing said core such that said upholstery material can be bonded to said core by RF welding.

7. The cover as defined in claim 6 wherein said upholstery material is a foam-backed fabric.

8. The cover as defined in claim 1 wherein said core is made of a fiberboard material which is covered on opposite sides by said upholstery material.

9. The cover as defined in claim 8 wherein said upholstery material is bonded to said core at the periphery thereof.

10. The cover as defined in claim 9 wherein said upholstery material includes a polymeric film on a side facing said core such that said upholstery material can be bonded to said core by RF welding.

11. The cover as defined in claim 10 wherein said upholstery material is a foam-backed fabric.

12. The cover as defined in claim 11 wherein said rim is made of polycarbonate.

13. A cover for an illuminated vanity mirror visor comprising:
   a generally planar core covered on at least one side with an upholstery material;
   a molded polymeric rim extending around the periphery of the core and encapsulating the fabric and core around the periphery thereof to provide structural rigidity to the planar core member and a trim finished appearance thereto; and
   means for attaching said rim to said visor for selectively covering a vanity mirror contained therein.

14. The cover as defined in claim 13 wherein said core is made of fiberboard.

15. The cover as defined in claim 14 wherein said core includes a plurality of parallel spaced slots formed therethrough.

16. The cover as defined in claim 13 wherein opposite sides of said core are covered with upholstery material.

17. The cover as defined in claim 13 wherein said upholstery material is bonded to said core at the periphery thereof.

18. The cover as defined in claim 13 wherein said upholstery material includes a polymeric film on a side facing said core such that said upholstery material can be bonded to said core by RD welding.

19. The cover as defined in claim 17 wherein said upholstery material is a foam-backed fabric.

20. The cover as defined in claim 13 wherein said core is made of a fiberboard material which is covered on opposite sides by said upholstery material.

21. The cover as defined in claim 20 wherein said upholstery material is bonded to said core at the periphery thereof.

22. The cover as defined in claim 21 wherein said upholstery material includes a polymeric film on a side facing said core such that said upholstery material can be bonded to said core by RF welding.

23. The cover as defined in claim 22 wherein said upholstery material is a foam-backed fabric.

24. The cover as defined in claim 23 wherein said rim is made of polycarbonate.

* * * * *